Figure 1:
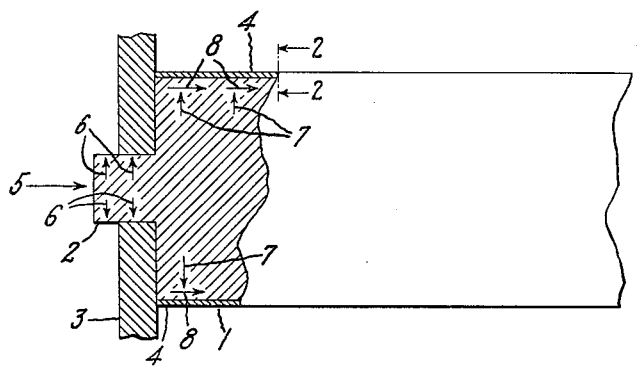

Aug. 1, 1961 G. HANSEL, JR 2,994,125
HARD SURFACE METAL STRUCTURE
Filed Dec. 26, 1956

INVENTOR.
GRANT HANSEL JR.
BY
HIS ATTORNEY

United States Patent Office 2,994,125
Patented Aug. 1, 1961

2,994,125
HARD SURFACE METAL STRUCTURE
Grant Hansel, Jr., West Winfield, N.Y., assignor to General Electric Company, a corporation of New York
Filed Dec. 26, 1956, Ser. No. 630,478
9 Claims. (Cl. 29—194)

My invention relates to hard surface composite metal structures. More particularly, it relates to such structures which are readily fabricated, enable economical use of materials, and which possess suitable mechanical soundness.

Hard surfaced composite metal structures are well known. Applied metal surfaces or inserts are used to protect parts subjected to excessive wear, such as valve seats of internal combustion engines. The use of hard surfacing alloys to protect the leading edges of steam turbine buckets or blades, particularly in the last stages, is also well known. Such turbine blades are hard surfaced primarily to prevent erosion caused by high speed collisions between the blades and droplets of condensed steam. With the outer portion of the blade moving at velocities of over 1000 feet per second, the wearing of unprotected collision areas, primarily the leading edge of the blade, is normally so excessive that reblading is often necessary after only a few months of operation. Turbine blades have heretofore been protected from such wear by brazing hard surface alloy inserts into recesses machined into the blade. This involved precise machining and is generally unsatisfactory from production and economic considerations. Welding molten hard surfacing alloy directly onto the blade results in dynamically unsound buckets and the heat produced results in undesirable stresses therein. More recently, hard metal has been sprayed onto the blade by metal spraying techniques in well known manners.

While sprayed metal surfaces are commonly desirable for many applications, they are normally limited in their scope of usefulness to application on surfaces whose geometry permits utilization of deposition shrinkage which occurs in them in such manner as to cause a gripping action. Such an application is ideally represented in the metal spraying of the convex surface of a shaft or similar object, in which the full periphery receives a continuous coating. In many cases such a continuous coating is not called for and failures occur at the ends of the coating because the shear strength of the joint between the coating and the base metal is insufficient to resist the separating influence of the residual stresses which exist in the coating. These residual stresses are present in the coating because of shrinkage factors which are inherent in the method of application, and they are aggravated by mechanical shocks, particularly shock applied parallel to the long axis of the metal sprayed interface. In an effort to overcome the susceptibility of the coating to failure by cracking and separation, a relatively ductile interlayer of metal such as nickel, austenitic stainless steel, silver, copper and the like has been used to improve the shear strength of the joint between the hard outer layer and the base metal to which it is applied. By so improving the shear strength of the joint, the composite structure is rendered more capable of withstanding the additional stresses accompanying mechanical shock. However, it has been found that even such a ductile interlayer does not prevent separation of the coating from the base metal when certain conditions of severe shock or impact are imposed on the metal sprayed assembly, particularly in an area where a non-ideal geometry for the application of metal sprayed coatings exists. Such problem areas rendering metal sprayed coatings subject to separation under mechanical shock are frequently encountered in various metal spraying applications, and their deficiencies are particularly outstanding in the case of the assembly of turbine blades into the turbine stage.

Formerly, the outer ends of turbine blades were left free. However, the resultant vibration, especially with longer blades, resulted in early failure and incorrect spacing. Additionally, the radial spreading of the driving fluid stream due to high pressure on the concave face of the blade resulted in the spilling of fluid over the free blade tips and loss of available fluid energy. It is now customary to fasten a shroud or band to the tips of the blades, the shroud usually being divided into sections with each covering a plurality of blade tips. An accepted manner of providing for the fastening of the shroud to the blade tip is by machining one or more tenons into the end of the blade which pass through and mate with holes in the shroud, the free end of the tenon being then peened to join the shroud and blade. While this method of fabrication is satisfactory for most purposes, it has been found that the peening operation and the mechanical shock and cold working resulting therefrom causes the hard surfacing layer on the outer portion of the blade to separate during the riveting operation. It is believed that such separation is caused by direct impact or the cold working of the tenon or riveted portion which working extends into the blade proper. As the tenon is riveted, it spreads or expands outwardly and the forces extend into the blade expanding the blade, producing shearing stresses due to the different physical properties of the blade metal and the hard surfacing alloy. As a result, the incipient or actual upsetting takes place at the interface between the blade base metal and the hard surface alloy and failure of the coating results. It has been found that the provision of a ductile interlayer alone between the hard surface coating and the base metal does not obviate the separation of the coating under such upsetting forces.

A main object of this invention is to provide a hard surfaced metal structure which is resistant to forces which tend to separate the components of the structure and a method for producing such a structure.

Briefly, my invention comprises a mechanically and erosion resistant hard surfaced metal structure having a base metal having superimposed thereon consecutive layers of metal comprising, first, a layer of solder, brazing or soft filler metal, a layer of ductile metal on the filler metal and, finally, a layer of hard surfacing metal, and the method of making such a structure.

The features of my invention which I believe to be novel are set forth with particularity in the claims appended hereto. My invention, itself, however, together with further objects and advantages thereof can best be understood from a consideration of the following description and the drawing in which FIG. 1 is an elevational cross-sectional view of the shroud end of a conventional turbine blade and FIG. 2 is an enlarged partial view of FIG. 1 in the direction 2—2.

While I describe my invention with particular reference to turbine blades in which respect it has a very useful application, it will be realized that it applies as well to any metal structure of the composite type which is subject to failure in the manner described.

Figure 2:
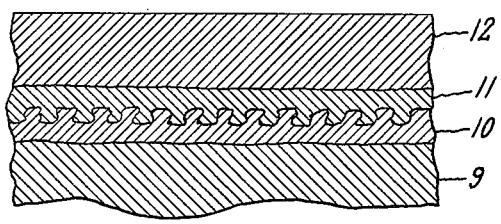

Referring to FIG. 1 of the drawing, there is shown a partial cross-sectional view of the outer portion of a turbine blade and integral therewith a tenon 2 for fastening the blade 1 to shroud 3 by riveting of the tenon. The leading edge, or part thereof subject to erosive wear, of the blade 1 is provided with a plurality of layers of metal as described hereinafter and as shown more particularly in FIG. 2 to protect the blade from excessive wear and erosion caused by impinging droplets of condensed steam.

During the riveting of tenon 2 to fix shroud 3 to blade 1, the riveting impact or force may be represented by vector 5. This riveting force 5 produces an expansion or outward spreading of the metal of tenon 2 perpendicular to its longitudinal axis under forces represented by vectors 6 as well as a peening action. It has been found when hard surfacing metal is sprayed directly on the turbine blade or even with a ductile metal interlayer between it and the blade, cracking and separation of the composite layer from the blade occurs during the subsequent riveting operation. Hardness tests made at various points on turbine blades in region of the tenon indicate that plastic deformation of the metal during the riveting operation extends into the blade proper. This produces expansive resultant forces represented by vectors 7. Further, because of the differing physical properties of the hard surfacing layer and the base blade metal, shearing forces represented by vectors 8 are produced at the interface between the blade metal and the added coating causing rupture and failure of the latter in the absence of the practice of my invention. It is probable that the forces transmitted into the metal of the blade through the shroud at the blade edge also contribute to the failure of the coating.

At pointed out above, I obviate the separation of the hard surfacing composite layer from the base metal by providing, first, on the base metal 9 a soft filler metal, solder or brazing metal layer 10. This filler metal layer 10 is applied by any of those welding processes and techniques whose compatibility with the requirements of the filler metal is such as to produce a uniform metallurgical bond with the base metal. A preferred method when a solder, brazing or filler metal is used includes manual application in the well-known manner using hand torch, flux, and filler rod. The layer is uniformly applied to the machined base metal surface to a thickness which may typically range from 0.001 inch and 0.020 inch more or less as determined by the method of application and the fluid properties of the solder or brazing filler metal. Any of a number of metals can be used for the solder or filler metal layer, a typical composition used being an alloy consisting of, by weight, 50% silver, 15.5% copper, 16.5% zinc and 18% cadmium. AWS–ASTM brazing filler metals BAg–1, consisting of, by weight, 45% silver, 15% copper, 16% zinc and 24% cadmium BAg–2, consisting of, by weight, 35% silver, 26% copper, 21% zinc and 18% cadmium and BAg–6, consisting of, by weight, 50% silver, 34% copper and 16% zinc can also be used as well as others which will occur to those skilled in the art.

After placement of the filler metal layer, the surface is cleaned wtih a suitable solvent, and then roughened by grit blasting or some other suitable process. The succeeding layer 11 is composed of a metal which is ductile relative to the hard surface coating. Among the metals useful for this purpose are nickel, silver, austenitic stainless steel, tin, copper, and various other metals and alloys. Nickel is preferred. The ductile layer is applied by metal spraying and has a typical thickness of about 0.006 inch, though it can vary from 0.002 to 0.030 inch more or less as desired. Generally, two passes of the spray head are sufficient to deposit 0.006 inch of metal. The contact between this layer and the roughened surface of the filler is characterized by a gripping force which the cooling and contracting ductile metal exerts on the solder or filler metal.

The final hard surfacing layer 12, again applied by metal spraying, is selected for its suitability to the environment in which it will operate and may be any metal or ceramic which can be applied by the metal spraying process. Such hard surfacing alloy can be any of those known in the art and may be an alloy of high cobalt content. From the point of convenience, I prefer an alloy which is available in wire form so that a continuous production operation can be maintained. Such an alloy is that disclosed in my copending application, Ser. No. 630,477, filed December 26, 1956, now Patent 2,855,295, assigned to the same assignee as this invention, comprising, by weight, a minimum of 56% cobalt, 27%–30% chromium, 3%–6% tungsten, 2%–4% nickel, 0.03% to 0.20% manganese and from 0.25% to 0.40% carbon. The specific preferred alloy comprises, by weight, 28% chromium, 4.5% tungsten, 2% nickel, 0.15% manganese and 0.30 to 0.35% carbon, with the remainder essentially cobalt. Preferably, the thickness of the hard surfacing coating is about 0.06 inch, though it will be realized that it may be varied widely depending upon the use of the treated article. For turbine blades, the thickness is preferably as above with upper and lower limits at about 0.055 inch and 0.065 inch. Typically, about 48 passes are required to deposit 0.06 inch of metal, although this, of course, varies with the particular apparatus used.

After metallizing has been completed, the metallized area is slowly heated in a neutral or reducing flame to a temperature above that at which the lowermost or filler metal layer alone melts. A temperature about 10 to 20° F. above the melting point of the solder is normally sufficient. During the heating cycle, the molten filler metal layer 10, being in intimate mechanical contact with the ductile layer 11 which has been metal sprayed over it, wets this layer, alloying with it and penetrating its pores. This bonding is influenced by the following factors among others: (a) The intimate contact existing between the layers of filler metal and ductile alloy as a result of the collision of the ductile alloy particles with the filler metal layer during metal spraying, and the gripping action which these particles exert on the roughened surface of the filler metal as they solidify and contract, (b) The expansion of the filler metal as it becomes molten, (c) The assumption of fluid properties by the filler metal as it becomes molten, such properties partially determining the ability of the filler metal to wet the ductile layer and undergo capillary flow into such interstices as exist in the ductile layer, and (d) The passivity of the ductile layer with respect to such contaminants as may combine with it to prevent alloying with the filler metal.

The technique described above involves metallurgical bonding which eliminates the need for a flux or controlled atmosphere such as would be required if two given metals were to be brazed or soldered together under normal atmospheric conditions. A flux cannot be used for the type of metal spraying application herein described because it would interfere with the deposition of the ductile layer on the filler metal and/or its residues would be either corrosively or mechanically detrimental to the service life of the metal sprayed coating.

When the hard surfacing coating is applied as above, it successfully withstands severe mechanical shock and working such as is encountered in riveting shrouds to turbine blades so treated and in which the riveted tenon is an integral part of the blade. It is important that the filler metal layer be applied and the finished article heat treated in order to prevent failure. When the filler metal and heat treatment were omitted, failure occurred during riveting. Of course, the hard surface is polished or ground as desired.

I have provided by this invention a simple production method for applying new and unique hard surfacing means to articles or base metal to prevent erosion. The hard surface composite so produced is characterized by resistance to severe mechanical shock and cold working.

What I claim as new and desire to secure by Letters Patent of the United States is:

1. A hard surfaced metal structure capable of resisting erosion comprising a base metal having consecutively superimposed thereon a layer of brazing metal, a layer of a second metal selected from the group consisting of nickel, silver, stainless steel, tin and copper, and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metal being bonded together.

2. A hard surfaced metal structure capable of resisting erosion comprising a base metal having consecutively superimposed thereon a layer of brazing metal, a layer of a second metal selected from the group consisting of nickel, silver, stainless steel, tin and copper, and a layer of hard surfacing metal consisting of, by weight, 28 percent chromium, 4.5 percent tungsten, 2 percent nickel, 0.15 percent manganese, 0.3 to 0.35 percent carbon, with the remainder essentially cobalt, the adjacent layers of metal being bonded together.

3. A hard surfaced metal structure capable of resisting erosion comprising a base metal having consecutively superimposed thereon a layer of brazing metal, a layer of nickel and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metal being bonded together.

4. A hard surfaced metal structure capable of resisting erosion comprising a base metal having consecutively superimposed thereon a layer of brazing metal, a layer of nickel and a layer of hard surfacing metal consisting of, by weight, 28 percent chromium, 4.5 percent tungsten, 2 percent nickel, 0.15 percent manganese, 0.3 to 0.35 percent carbon, with the remainder essentially cobalt, the adjacent layers of metal being bonded together.

5. A hard surfaced metal structure capable of resisting erosion comprising a base metal having consecutively superimposed thereon a layer of an alloy consisting of, by weight, 50 percent silver, 15.5 percent copper, 16.5 percent zinc and 18 percent cadmium which wets said base metal, a layer of a second metal selected from the group consisting of nickel, silver, stainless steel, tin and copper, and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metal being bonded together.

6. A hard surfaced metal structure capable of resisting erosion comprising a base metal having consecutively superimposed thereon a layer of an alloy consisting of, by weight, 50 percent silver, 15.5 percent copper, 16.5 percent zinc and 18 percent cadmium which wets said base metal, a layer of a second metal selected from the group consisting of nickel, silver, stainless steel, tin and copper, and a layer of hard surfacing metal consisting of, by weight, 28 percent chromium, 4.5 percent tungsten, 2 percent nickel, 0.15 percent manganese, 0.3 to 0.35 percent carbon, with the remainder essentially cobalt, the adjacent layers of metal being bonded together.

7. A hard surfaced metal structure capable of resisting erosion comprising a base metal having consecutively superimposed thereon a layer of alloy consisting of, by weight, 45 percent silver, 15 percent copper, 16 percent zinc and 24 percent cadmium, a layer of a second metal selected from the group consisting of nickel, silver, stainless steel, tin and copper, and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metals being bonded together.

8. A hard surfaced metal structure capable of resisting erosion comprising a base metal having consecutively superimposed thereon a layer of alloy consisting of, by weight, 35 percent silver, 26 percent copper, 21 percent zinc and 18 percent cadmium, a layer of a second metal selected from the group consisting of nickel, silver, stainless steel, tin and copper, and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metals being bonded together.

9. A hard surfaced metal structure capable of resisting erosion comprising a base metal having consecutively superimposed thereon a layer of alloy consisting of, by weight, 50 percent silver, 34 percent copper and 16 percent zinc, a layer of a second metal selected from the group consisting of nickel, silver, stainless steel, tin and copper, and a layer of hard surfacing metal consisting of, by weight, a minimum of 56 percent cobalt, 27 to 30 percent chromium, 3 to 6 percent tungsten, 2 to 4 percent nickel, 0.03 percent to 0.2 percent manganese, and from 0.25 to 0.40 percent carbon, the adjacent layers of metals being bonded together.

References Cited in the file of this patent

UNITED STATES PATENTS

| Number | Name | Date |
|---|---|---|
| 431,848 | Meyer | July 8, 1890 |
| 1,892,759 | Woodford | Jan. 3, 1933 |
| 2,068,848 | De Bats | Jan. 26, 1937 |
| 2,149,646 | Armstrong | Mar. 7, 1939 |
| 2,214,002 | Trainer | Sept. 10, 1940 |
| 2,410,844 | Signaico | Nov. 12, 1946 |
| 2,439,570 | Hensel | Apr. 13, 1948 |
| 2,473,712 | Kinney | Jan. 21, 1949 |
| 2,519,683 | Marien | Aug. 22, 1950 |
| 2,547,947 | Kleis | Apr. 10, 1951 |
| 2,564,661 | Arent | Aug. 21, 1951 |
| 2,796,361 | Chester | June 18, 1957 |